April 17, 1962 P. F. PITTMAN 3,030,523

CONDITION RESPONSIVE IMPEDANCE SWITCHING ARRANGEMENT UTILIZING HYPERCONDUCTIVE DIODE

Filed July 24, 1958

WITNESSES

John E. Heasley Jr.

Myron E. Click

INVENTOR

Paul F. Pittman

BY F. E. Browder

ATTORNEY

United States Patent Office 3,030,523 Patented Apr. 17, 1962

3,030,523

CONDITION RESPONSIVE IMPEDANCE SWITCHING ARRANGEMENT UTILIZING HYPERCONDUCTIVE DIODE

Paul F. Pittman, Dormont, Pa., assignor to Westinghouse Electric Corporation, East Pittsburgh, Pa., a corporation of Pennsylvania Filed July 24, 1958, Ser. No. 750,761
4 Claims. (Cl. 307—88.5)

This invention relates to switching apparatus in general, and in particular to switching apparatus which operates from variable resistance sensing elements.

The advent of a semiconductor diode having such characteristics that on exceeding certain specified reverse current and voltages, the diode becomes highly conductive and thereafter will carry a substantial reverse current at low voltage, has led to many new electronic applications. The phenomena described above is not a Zener breakdown, nor is it an avalanche breakdown. This unique breakdown characteristic can be repeated indefinitely. This breakdown has been designated as a hyperconductive breakdown and a diode having such a characteristic will be referred to hereinafter as a hyperconductive diode.

Such a hyperconductive semiconductive diode is described in a copending application Serial No. 642,743 entitled "Semiconductive Diode," filed February 27, 1957 now Patent No. 2,953,693 and assigned to the same assignee as the present invention. Another semiconductive diode having the characteristics described above is described in an article entitled, "The Four Layer Diode," by Dr. William Shockley, in Electronics Industries and Tele Tech, August 1957 pages 58 to 60, 161 to 165.

One important phase of control engineering deals with the design of small "Off-On" controllers which operate from variable resistance sensing elements. Typical examples of such might be photoelectric door openers or thermal overload protectors. When transistor circuitry is used, the size of such controls can be decreased considerably compared with controls using vacuum tubes. However, unless the cost of the control is to be increased, the size of the output relay which can be operated by transistorized controls is quite small. Usually a small sensitive relay must be used at the output of the transistor circuit which in turn controls some larger relay. However, the use of a sensitive relay is objectionable from the standpoints of cost and reliability. Since in many cases the ultimate output of a control is a motor line contactor or other large relay, the most desirable control would have sufficient power to operate this large relay directly.

It is an object of this invention to provide an improved switching apparatus.

It is another object of this invention to provide an improved switching apparatus which operates from a variable resistance sensing element.

It is still another object of this invention to provide an improved switching apparatus which is small in size, inexpensive, and still has sufficient power to operate large loads directly.

It is a further object of this invention to provide an improved switching apparatus which utilizes completely static elements, thus being very reliable, rugged, and furnishing maintenance-free operation.

Broadly, the present invention provides a condition responsive impedance switching arrangement utilizing a hyperconductive diode wherein, a condition responsive element is operative with a pulse generator and a power supply to cause a hyperconductive diode device to break down in response to a predetermined condition to permit the switching operation to be performed.

Further objects of this invention will become apparent from the following description when taken in conjunction with the accompanying drawings. In said drawings, for illustrative purposes only, there is shown a preferred form of this invention.

Figure 1:
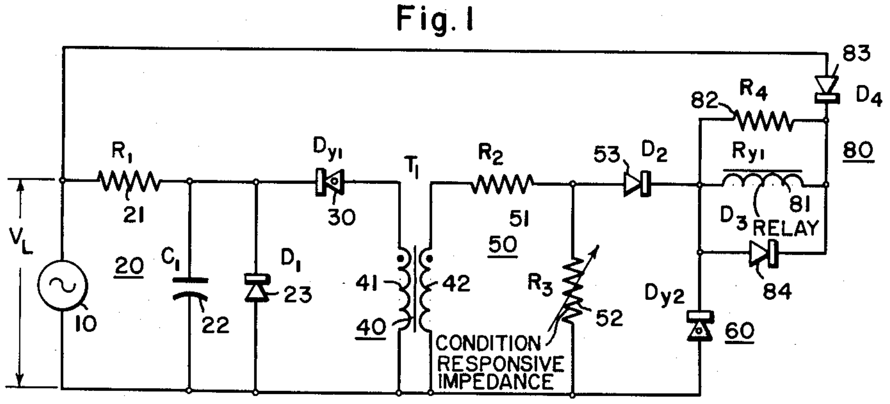
FIGURE 1 is a schematic diagram of an improved switching apparatus embodying the teachings of this invention.

Referring to FIG. 1 there is shown an improved switching apparatus embodying the teachings of this invention which comprises, in general, a supply voltage 10 connected to energy storage circuit 20. The voltage from the energy storage circuit 20 is impressed in a reverse direction across the hyperconductive diode 30 and a primary winding 41 of a pulse transformer 40. A secondary winding 42 is connected to a voltage dividing network 50 which comprises an impedance shown as a resistor 51 and a variable resistance sensing element 52 connected in series across the secondary winding 42. The voltage across the variable resistance sensing element 52 is connected across the hyperconductive diode 60 through a rectifier 53. A load circuit 80 is also connected across the supply voltage 10. The load circuit 80 comprises a rectifier 83, a relay coil 81, and the hyperconductive diode 60 connected in series circuit relationship, A resistor 82 is to be connected in parallel with the relay coil 81. A rectifier 84 is also connected in parallel with the relay coil 81.

The circuit to the left of the pulse transformer 40 comprises a pulse generator or relaxation oscillator which supplies one pulse every half-cycle of the supply voltage 10. As the voltage $V_L$ rises during a positive half-cycle, a capacitor 22 of the energy storage circuit 20 charges through a resistor 21, also of the storage circuit 20. The charge voltage of the capacitor 22 is applied across the hyperconductive diode 30 in the reverse direction causing the diode 30 to block the flow of current. When the charge voltage of the capacitor 22 reaches the breakdown voltage of the hyperconductive diode 30 breakdown occurs which causes the capacitor 22 to be discharged into the primary winding 41 of the pulse transformer 40.

Figure 2:
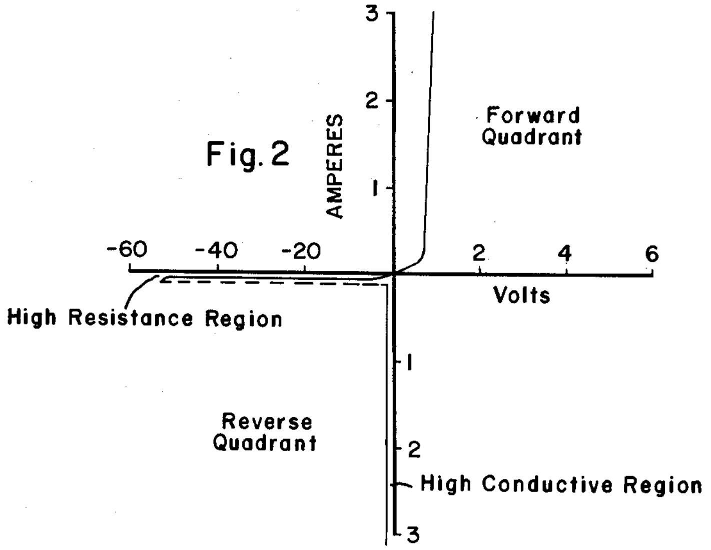
FIG. 2 is a graphical representation of a characteristic of a semiconductive diode to be utilized in this invention.

Referring to FIG. 2, the curve shows how a hyperconductive diode responds to the application of different voltages. Consider the upper right or forward quadrant, when a forward voltage of the order of one voltage unit is applied, the current builds up to about three current units. When the voltage is reversed, it builds up in the reverse direction to about 55 voltage units with only a small fraction of the current unit of current flowing, and the diode suddenly becomes highly conductive or hyperconductive and the voltage drops to about one voltage unit as shown in the lower left or reverse quadrant. The hyperconductive diode has then become a conductor in the reverse direction with a low ohmic resistance and the current builds up rapidly to several current units.

As shown in the reverse quadrant, when the hyperconductive diode breaks down, the voltage drops along a substantially straight line to about one voltage unit, and very little power is dissipated in maintaining a diode highly conductive in the reverse direction. The diode can be rendered highly resistant again by reducing the current below a minimum threshold value and voltage below the breakdown value. Consequently, the curve can be repeatedly followed as desired by properly controlling the magnitude of reverse current and voltage.

The breakdown or process of the hyperconductive diode becoming highly conductive in the reverse direction occurs within a small amount of time. Investigations have revealed that from the time of subjecting the diode to the necessary voltage in the reverse direction to render it highly conductive or hyperconductive to the time when it sustains relatively high currents at a low reverse voltage, comprises an interval of the order of 1/10 of a microsecond. Further, it has been found that the breakdown of the diode in a reverse direction will respond to currents of a very wide range of frequency, of the order, for example, of one megacycle.

Referring again to FIG. 1, the values of the resistor 21 and the capacitor 22 can be chosen so that one or more pulses occur during each cycle of the supply voltage 10. Since only a single pulse is necessary for the operation of the other half of the circuit, the values of the resistor 21 and the capacitor 20 may be chosen for one pulse, thereby keeping the dissipation of the hyperconductive diode 30 at a minimum. Very short, high energy pulses are obtained from this circuit because, as hereinbefore stated, the breakdown time of the hyperconductive diode 30 may be on the order of 0.1 microsecond. Since the breakdown time for the hyperconductive diode 30 is so short, very high pulse currents can be obtained by using low impedance pulse transformers.

Thus, the function of the pulse generator or relaxation oscillator is to supply short, high energy pulses which occur at the voltage maximum of the positive half-cycle of the supply voltage 10.

The hyperconductive diode 60 is used as a controlled rectifier. It is chosen so that its breakdown voltage is well above the peak voltage of the supply voltage 10. It therefore can never be switched to its hyperconductive region by the action of the supply voltage 10 alone. Since breakdown of the hyperconductive diode 60 can occur when the breakdown voltage is exceeded for only 1/10 of a microsecond, the pulses supplied by the secondary winding 42 of the pulse transformer 40 can easily cause breakdown.

The resistor 51 and the variable resistance sensing element 52 forms a voltage divider network 50 across which the pulse from secondary winding 42 is applied. By varying resistance of the variable resistance sensing element 52, the pulse voltage applied to the hyperconductor 60 can be varied above and below its breakdown voltage. If the element 52 is a thermistor, its resistance can be varied by applying a variable heat input to the element 52. If the element is a photocell conductor, for example, its resistance may be varied by applying a variable light input to the element 52. It is to be noted that other variable resistance sensing elements beside the two above mentioned examples may be utilized for the element 52.

Figure 3:
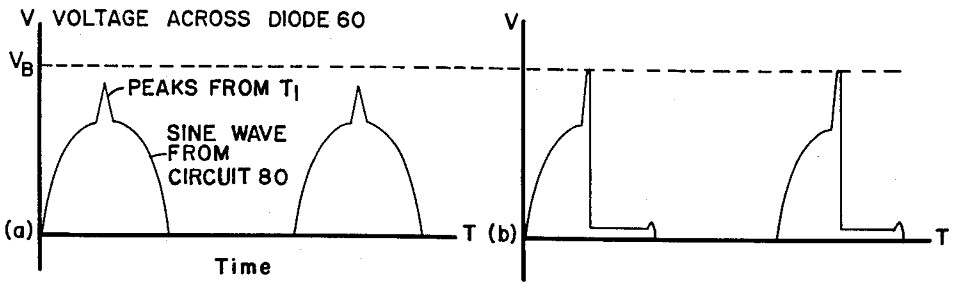
FIGS. 3A and 3B are graphical representations of wave forms present at a selected point in the apparatus of FIG. 1.

Once breakdown of the hyperconductive diode 60 occurs due to a pulse from the secondary 42, current flows through the rectifier 83, the relay coil 81 and the hyperconductive diode 60 in the reverse direction. This current is large enough to keep the diode 60 in the hyperconductive region for the rest of the positive half-cycle of the supply voltage 10. The voltage across the hyperconductive diode 60 is shown in FIG. 3. FIG. 3A shows the voltage across the diode 60 when the pulse is below the breakdown voltage. In this case, the diode 60 blocks the flow of current throughout the positive half-cycle as all of the supply voltage appears across it. The trigger pulse can be seen at the maximum point of the positive half-cycle. FIG. 3B shows the voltage across the diode 60 when breakdown occurs. During the first half of the positive half cycle, the diode 60 blocks. At the maximum point, the trigger pulse occurs, reaches the breakdown voltage $V_B$, and causes the diode 60 to break down to a very low voltage. The breakdown is maintained by the relay coil 81 current causing the voltage across the diode 60 to remain very low for the remainder of the positive half-cycle. Since the conducting voltage drop of the diode 60 is negligible, the relay coil 81 is effectively placed across the line voltage $V_L$ after breakdown and the current drawn is determined by the relay impedance. The maximum current is limited by the hyperconductive diode 60 dissipation. Since the hyperconductive diode 60 is either broken down or not broken down by the pulse from the transformer 40, "Off-On" control of the relay current is obtained as a function of the sensing element resistance.

Since the discharge pulse from the capacitor 22 may be as short as 0.1 microsecond, the situation can arise where the inductance of the relay coil 81 may delay the relay current long enough for the voltage to rise again across the hyperconductive diode 60 allowing it to return to its nonconducting state. If this happens, the hyperconductive diode 60 will recover immediately from the discharge of the capacitor 22 and no relay coil 81 current will flow. To prevent this condition, it is sometimes necessary to shunt the relay coil 81 with a resistor 82 just small enough to provide the hyperconductive diode 60 with a minimum sustaining current.

The function of the rectifier 23 is to insure that the energy storage 20 charges the capacitor 22 only on the positive half-cycle of the supply voltage 10. The function of the rectifier 83 is to block the application of negative half-cycles of the supply voltage 10 to the relay coil 81. The function of the rectifier 84 is that of a free-wheeling or commutating rectifier to provide a path for inductive current flow from the relay coil 81 after the controlled positive half-cycle is through.

The circuit illustrated in the drawing is further advantageous in that it does not require that a high voltage be placed across the sensing element 52. This results in a lower sensing element dissipation, and is less susceptible to changes in calibration due to line voltage variations.

Since the hyperconductive diode 60 is reset at the end of each positive half-cycle by the current zero, the circuit is capable of responding to a change in the resistance of the sensing element 52 within the time of one cycle of the supply voltage 10. However, since the response of the relay coil 81 is usually slower than one cycle, the overall circuit response will be approximately that of the relay coil 81. However, if a load other than an inductive load is to be supplied with voltage the single cycle response time is important. Because the hyperconductive diode 60 is either "Off" or "On" the overlap between the switching resistances is very small compared to ordinary bistable circuits.

In many transistor circuits, the transistor is used as an "On-Off" device which quickly traverses its high dissipation region. In this service more power can be controlled by the transistor since its average dissipation is low. The hyperconductive diode acts in a similar fashion but has several advantages over the transistor. It can switch much faster than a transistor and therefore has a lower dissipation. Unlike the transistor, the hyperconductive diode does not require the continuous flow of input power as long as output power is desired. For this reason, the hyperconductive diode is a more efficient switch gainwise than the transistor. Another advantage of the hyperconductive diode is that it can withstand much higher voltages than presently available transistors.

In conclusion, it is to be pointed out that while the illustrated example constitutes a practical embodiment of my invention, I do not limit myself to the exact details shown, since modification of the same may be effected without departing from the spirit and scope of this invention.

I claim as my invention:

1. In a switching apparatus operative with a power supply, in combination; a pulse generator including output means; a voltage divider network comprising an impedance and a condition responsive impedance element connected in circuit relationship to said output means; an output circuit operatively connected to power source; said output circuit including a hyperconductive diode for blocking current in the output circuit; the breakdown voltage of said hyperconductive diode being greater than the magnitude of the potential across said diode from said power supply; and means connecting said hyperconductive diode in circuit relationship with said condition responsive impedance element so that the potential across said element exceeds said breakdown voltage in response to a predetermined condition thereby causing breakdown of said device.

2. In a switching apparatus operative with a power supply, in combination; a pulse generator comprising an energy storage network connected across a first hyperconductive diode; said first hyperconductive diode having a selected breakdown characteristic in response to a predetermined magnitude of voltage from said energy storage network; a voltage divider network comprising an impedance and a condition responsive impedance device connected in circuit relationship to an output of said pulse generator, an output circuit operatively connected to said power source; said output circuit including a second hyperconductive diode for blocking current in the output circuit; the breakdown voltage of said second hyperconductive diode being greater than the magnitude of the potential across said second diode from said power supply; and means connecting said second hyperconductive diode in circuit relationship with said condition responsive impedance element so that the potential across said element exceeds said breakdown voltage in response to a predetermined condition thereby causing breakdown of said device.

3. In a switching apparatus operative with a power supply, in combination; a pulse generator, a voltage divided network comprising an impedance and a condition responsive impedance element connected in series circuit relationship across an output of said pulse generator; a hyperconductive diode and a rectifier connected in series circuit relationship across said element; and an output circuit operatively connected to said power supply; said output circuit including said hyperconductive diode for blocking current flow in the output circuit; the breakdown voltage of said hyperconductive diode being greater than the magnitude of the potential across said diode from the power supply; said rectifier blocking current flow to said voltage divider network from said power supply; the voltage across said condition responsive impedance element being sufficient to cause breakdown of said hyperconductive diode in response to a predetermined condition.

4. In a switching apparatus operative with a power supply, in combination; a pulse generator, a voltage divider network comprising an impedance and a condition responsive impedance element connected in series circuit relationship across an output of said pulse generator; a hyperconductive diode and a first rectifier connected in series circuit relationship across said element; and an output circuit operatively connected to said power source; said output circuit including said hyperconductive diode in series circuit relationship with a second rectifier; said hyperconductive diode blocking current flow in said output circuit; the breakdown voltage of said hyperconductive diode being greater than the magnitude of the potential across said diode from said power supply; said first rectifier blocking current flow to said voltage divider network from said power supply; said second rectifier blocking current flow to said power supply when the voltage across the condition responsive impedance element exceeds the voltage across the hyperconductive diode from said power supply; the voltage across said condition responsive impedance element being sufficient to cause breakdown of said hyperconductive diode in response to a predetermined condition.

References Cited in the file of this patent

UNITED STATES PATENTS

| | | |
|---|---|---|
| 2,769,131 | Immel | Oct. 30, 1956 |
| 2,843,765 | Aigrain | July 15, 1958 |
| 2,879,412 | Hoge et al. | May 24, 1959 |

FOREIGN PATENTS

| | | |
|---|---|---|
| 522,986 | Great Britain | July 2, 1940 |
| 1,004,663 | France | Apr. 16, 1957 |

OTHER REFERENCES

Kauke: "Radio-Electronic Engineering," April 1953, pp. 8–10.